(12) United States Patent
Syre-Aaker

(10) Patent No.: US 12,729,062 B2
(45) Date of Patent: Sep. 8, 2026

(54) OPTIMIZING CONTAINER DELIVERY VEHICLE TASK SCHEDULING

(71) Applicant: Autostore Technology AS, Nedre Vats (NO)

(72) Inventor: Vegard Syre-Aaker, Asker (NO)

(73) Assignee: AutoStore Technology AS, Nedre Vats (NO)

( * ) Notice: Subject to any disclaimer, the term of this patent is extended or adjusted under 35 U.S.C. 154(b) by 680 days.

(21) Appl. No.: 17/922,227

(22) PCT Filed: Apr. 28, 2021

(86) PCT No.: PCT/EP2021/061169
§ 371 (c)(1),
(2) Date: Oct. 28, 2022

(87) PCT Pub. No.: WO2021/219742
PCT Pub. Date: Nov. 4, 2021

(65) Prior Publication Data

US 2025/0326582 A1 Oct. 23, 2025

(30) Foreign Application Priority Data

Apr. 30, 2020 (NO) .................................... 20200514

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0464* (2013.01); *B65G 1/0478* (2013.01);
(Continued)

(58) Field of Classification Search
CPC ................ B65G 1/1373; B65G 1/0464; B65G 2203/0266; G06Q 10/06316; G06Q 10/08; G06Q 10/087
See application file for complete search history.

(56) References Cited

U.S. PATENT DOCUMENTS 6,986,068 B2 * 1/2006 Togawa ................ G06F 1/3293 713/320
7,912,574 B2 3/2011 Wurman et al.
(Continued)

FOREIGN PATENT DOCUMENTS

CN 107357646 A 11/2017
CN 107976918 A * 5/2018 ............. G05B 19/04
(Continued)

OTHER PUBLICATIONS

CN-107976918-A (Year: 2018).*
(Continued)

*Primary Examiner* — Ernesto A Suarez
*Assistant Examiner* — Laurence R Brothers
(74) *Attorney, Agent, or Firm* — Baker Botts L.L.P.

(57) ABSTRACT

A method, control system and computer program for utilizing the operational capacity of container handling vehicles when assigned tasks of delivering or retrieving identified storage containers in an automatic storage and retrieval system are provided. The control system assigns tasks without deadlines, calculates end times and end positions of the container handling vehicles when the assigned tasks are completed, and assigns tasks with a deadline. The control system checks if the container handling vehicles can meet the deadline after first completing the task without a deadline, and ranks the tasks assigned to the container handling vehicles. Tasks for which the deadline can be met after first finishing a task without a deadline are ranked first, and
(Continued)

further according to the arrival times of the container handling vehicles at the port.

8 Claims, 4 Drawing Sheets

(51) Int. Cl.

| | |
|---|---|
| ***B65G 1/06*** | (2006.01) |
| ***G05B 19/418*** | (2006.01) |
| ***G06Q 10/0631*** | (2023.01) |
| ***G06Q 10/08*** | (2024.01) |
| ***G06Q 10/087*** | (2023.01) |

(52) U.S. Cl.
CPC ............. *B65G 1/065* (2013.01); *B65G 1/137* (2013.01); *G05B 19/41895* (2013.01); *G06Q 10/06316* (2013.01); *G06Q 10/08* (2013.01); *G06Q 10/087* (2013.01); *B65G 2201/0235* (2013.01); *B65G 2203/0266* (2013.01); *G05B 2219/32252* (2013.01); *Y02P 90/02* (2015.11)

(56) References Cited

U.S. PATENT DOCUMENTS

| | | | | |
|---|---|---|---|---|
| 8,682,474 | B2 | 3/2014 | Rotella et al. | |
| 9,389,912 | B2 | 7/2016 | Xu et al. | |
| 2007/0110094 | A1* | 5/2007 | Tobita | G06F 9/4887 370/453 |
| 2010/0114360 | A1 | 5/2010 | Starr et al. | |
| 2013/0302132 | A1 | 11/2013 | D'Andrea | |
| 2016/0145058 | A1* | 5/2016 | Lindbo | B65G 1/0457 700/218 |
| 2019/0066041 | A1 | 2/2019 | Hance et al. | |
| 2019/0236524 | A1* | 8/2019 | Brehm | G05D 1/0297 |

FOREIGN PATENT DOCUMENTS

| | | | |
|---|---|---|---|
| CN | 110775496 | A | 2/2020 |
| GB | 2559631 | A | 8/2018 |
| JP | 2002167014 | A | 6/2002 |
| NO | 317366 | B1 | 10/2004 |
| NO | 20181647 | A1 | 12/2019 |
| WO | 2014/090684 | A1 | 6/2014 |
| WO | 2015/185628 | A2 | 12/2015 |
| WO | 2015/193278 | A1 | 12/2015 |
| WO | 2019/068778 | A1 | 4/2019 |
| WO | 2019/232651 | A1 | 12/2019 |
| WO | 2019/238662 | A1 | 12/2019 |

OTHER PUBLICATIONS

International Search Report issued in Application No. PCT/EP2021/061169 mailed on Jul. 20, 2021 (6 pages).

Written Opinion issued in Application No. PCT/EP2021/061169 mailed on Jul. 20, 2021 (10 pages).

Norwegian Search Report issued in Norwegain Application No. 20200514 mailed on Oct. 30, 2020 (3 pages).

Zhang Yukun, Notification of the First Office Action and Search Report in Chinese Patent Application No. 2021800319388, mailed Mar. 28, 2025, 10 pages (including translation), National Intellectual Property Administration of the PRC, Beijing, China.

Miyake, Susumu, Office action in Japan patent application JP2022565801, mailed Jun. 12, 2025, 5 pages, published by Japan Patent Office, Toyko, Japan.

Iskandar, Muhamad Izzat Bin, Office Action in Malaysia patent application PI2022005965, mailed Dec. 24, 2025, 6 pages, Intellectual Property Corporation of Selangor, Malaysia.

Hoffert, Rudi, Extended European Search Report in EP25180533.9, mailed Sep. 16, 2025, 13 pages, European Patent Office, Munich, Germany.

Anonymous, examining communication in Republic of Korea patent application 1020227041447, mailed Apr. 15, 2026, 7 pages, Korean Intellectual Property Office, Daejeon, Republic of Korea.

Hoffert, Rudi, Examining communication in EPO patent application 25180533.9, mailed Jul. 3, 2026, 5 pages, European Patent Office, Munich, Germany.

* cited by examiner

| Tasks without deadline | Tasks with deadline | Assigned vehicle | Can finish task without deadline before task with deadline? | Task priority | Arrival time before task with deadline at port |
|---|---|---|---|---|---|
| 1.1 | 1.2 | 010 | yes | 1.1 – 1.2 | 6s |
| 2.1 | 2.2 | 017 | no | 2.2 – 2.1 | 4s |
| 3.1 | 3.2 | 115 | no | 3.2 – 3.1 | 8s |
| 4.1 | 4.2 | 099 | no | 4.2 – 4.1 | 11s |
| 5.1 | 5.2 | 120 | yes | 5.1 – 5.2 | 3s |
| 6.1 | 6.2 | 001 | yes | 6.1 – 6.2 | 5s |

FIG. 4

| Ranking of Tasks | Assigned vehicle | Task priority | Arrival time before task with deadline at port |
|---|---|---|---|
| 1 | 099 | 4.2 – 4.1 | 11s |
| 2 | 115 | 3.2 – 3.1 | 8s |
| 3 | 010 | 1.1 – 1.2 | 6s |
| 4 | 001 | 6.1 – 6.2 | 5s |
| 5 | 017 | 2.2 – 2.1 | 4s |
| 6 | 120 | 5.1 – 5.2 | 3s |

FIG. 5

OPTIMIZING CONTAINER DELIVERY VEHICLE TASK SCHEDULING

FIELD OF THE INVENTION

The present invention relates to an automated storage and retrieval system for storage and retrieval of storage containers handled by container handling vehicles, and more specifically to a method, system and computer program for optimizing operational capacity of container handling vehicles designated to deliver or retrieve storage containers at same port which is used for transferring storage containers out of or into the automatic storage and retrieval system.

BACKGROUND

FIG. 1 discloses a typical prior art automated storage and retrieval system 1 with a framework structure 100 and with container handling vehicles 201 operating on the system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of the framework structure 100, on which rail system 108 a plurality of container handling vehicles 201 are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the container handling vehicles 201 in a first direction X across the top of the frame structure 100, and a second set of parallel rails 111 arranged perpendicular to the first set of rails 110 to guide movement of the container handling vehicles 201 in a second direction Y which is perpendicular to the first direction X.

Also shown in FIG. 1 is a first rail in a first direction X, 110*a*, a second rail in a first direction X, 110*b*, a first rail in a second direction Y, 111*a* and a second rail in a second direction Y, 111*b*. The container handling vehicles 201 move laterally above the storage columns 105, i.e. in a plane which is parallel to the horizontal X-Y plane.

Storage containers 106 are stored in the columns 105 which define a third direction Z which is orthogonal to the first direction X and the second direction Y. The storage containers 106 are accessed by the container handling vehicles 201 through access openings 112 in the rail system 108, i.e. the rail system 108 is arranged on the framework structure 100 defining the circumference of each access opening 112 on top of each storage column 105. The upright members 102 of the framework structure 100 may be used to guide the storage containers when these out from and lowering of the containers into the columns 105. The stacks 107 of containers 106 are typically self-supportive.

The storage volume of the framework structure 100 has often been referred to as a grid 104, where the possible storage positions within storage columns 105 in this grid is referred to as a storage cell. Each storage column 105 may be identified by a position in an X- and Y-direction, while each storage cell may be identified by a container number in the X, Y and Z-direction.

In the framework structure 100, most of the columns 105 are storage columns 105, i.e. columns 105 where storage containers 106 are stored in stacks 107. However, some columns 105 may have other purposes.

In FIG. 1, columns 119 and 120 are special-purpose columns used by the container handling vehicles 201 to drop off and/or pick up storage containers 106 so that they can be transferred to an access station (not shown) where the storage containers 106 can be accessed from outside of the framework structure 100 or transferred out of or into the framework structure 100.

Within the art, columns for transferring a storage container in and out of the storage system is normally referred to as port column 119, 120 or a transfer column. A storage container is transferred to and from a port column 119, 120 via ports 119', 120' typically located at an opening at an end of the port column 119, 120. i.e. where storage containers are entering or exiting the port columns 119, 120. A port may also be located at other locations such as at a mid-level or ground level of a port column 119, 120.

Transportation and transferring of storage container 106 to an access station may be in any direction, that is horizontal, tilted and/or vertical. For example, the storage containers 106 may be placed in a random or dedicated column 105 within the framework structure 100, then picked up by any container handling vehicle 201 and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201 can drop off storage containers 106 to be transported to an access or a transfer station, and the second port column 120 may be a dedicated pick-up port column where the container handling vehicles 201 can pick up storage containers 106 that have been transported from an access or a transfer station.

The access station may typically be a picking or a stocking station where product items are removed from or positioned in the storage containers 106. In a picking or a stocking station, the storage containers 106 are normally not removed from the automated storage and retrieval system 1 but are returned into the framework structure 100 again once accessed. Port columns 119, 120 can also be used for transferring storage containers to another storage facility (e.g. to another framework structure or to another automated storage and retrieval system), to a transport vehicle (e.g. a train or a lorry), or to a production facility.

When a specific storage container 106 stored in one of the columns 105 disclosed in FIG. 1 is to be retrieved, one of the container handling vehicles 201 is assigned and instructed to retrieve the storage container 106 from its location and transport it to the port 119' of the port column 119. This operation involves moving the container handling vehicle 201 to a location above the storage column 105 in which the storage container 106 is located, retrieving the storage container 106 from the storage column 105 using a lifting device (not shown) of the container handling vehicle 201 and transporting the storage container 106 to the port 119' of the port column 119.

If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as digging within the art, may be performed with the same container handling vehicle 201 that is subsequently used for transporting the target storage container to the drop-off port column 119, or with one or a plurality of other cooperating container handling vehicles 201. Alternatively, or in addition, the automated storage and retrieval system 1 may have container handling vehicles 201 specifically dedicated to the task of temporarily removing storage containers from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201 is instructed to pick up the storage container 106 from the port 120' of the port column 120 transferring storage containers from an access or a transfer station and transport it to a location above the storage column 105 where it is to be stored. After any storage containers positioned at or above the target position within the storage column stack 107 have been removed, the container handling vehicle 201 positions the storage container 106 at the desired position. The removed storage containers 106 may then be lowered back into the storage column 105 or relocated to other storage columns.

Locations of each storage container 106 within the framework structure 100 and locations and movements of each container handling vehicle 201 operating on the storage and retrieval system are continuously monitored and controlled by a control system 500 as well as a reference to the content of each storage container 106 so that a desired storage container 106 can be delivered to the desired location at the desired time without the container handling vehicles 201 colliding with each other.

An example of a typical control system 500 is shown in FIG. 2 and comprises a master controller 220, a database 210 keeping track of the storage containers 106, a routing planner 200 used for finding optimal routes for the container handling vehicles 201 and a transmitter/receiver 225 for communicating instructions to each container handling vehicle 201. The control system 500 communicates with vehicle controllers 230 in each container handling vehicle 201 and controls traffic flow of the container handling vehicles 201 according to the routing planner 200.

In the description above, separate port columns 119, 120 for transferring storage container to and from the storage and retrieval system 1 are described. This provides an efficient solution. Only one of the port columns 119, 120 may however be used for both transferring storage container to and from the storage and retrieval system.

An automated storage and retrieval system 1 is typically operated by two or more container handling vehicles 201 serving the same port 119' of a port column 119 for transferring storage containers to an access station. Each container handling vehicle 201 is assigned and given a task by receiving instructions transmitted from the control system 500. A task may for instance be to get a specific storage container 106 from a storage column 105 where it is located, drive a set distance in a set direction, deliver a storage container 106 at the port 119' etc.

According to prior art, the focus has been to deliver storage containers 106 to a port 119' as fast as possible. When several container handling vehicles 201 serve the same port 119' for interacting with it, by delivering or retrieving a storage container 106 to or from the port 119', they may be at the port 119' or driving towards the port 119' at the same time. This may introduce an inefficiency problem at the port 119'. The container handling vehicles 201 may have to wait in queue before they can interact with the port 119', i.e. before delivering or retrieving a storage container 106 to/from the port. In this way, the operational capacity of each container handling vehicle 201 is not optimally utilized.

To fully utilize the operational capacity of container handling vehicles 201 designated to serve the same port 119', each container handling vehicle 201 ideally arrive at the port 119' right after another container handling vehicle 201 has finished its interaction with the port, i.e. delivering or retrieving a storage container to or from the port 119'.

If a container handling vehicle 201 starts to drive towards a port 119' too early, the operational capacity of the container handling vehicle 201 may not be optimally utilized since it may have to wait to deliver a storage container 106 to the port 119' if other container handling vehicles 201 are interacting with the port 119' or moving towards the port 119' for delivering or retrieving storage containers 106 at the same time.

The present invention addresses and solves this problem by ensuring that the port 119' is served by a container handling vehicle 201 with minimal waiting time at the port 119' thereby reducing the probability that container handling vehicles 201 must wait in queue at the port 119'.

Instead of standing still waiting in queue for other container handling vehicles 201 to finish interacting with a port, a container handling vehicle 201 is instructed to perform other intermediate tasks before delivering or retrieving a storage container 106 to and from the port.

SUMMARY OF THE INVENTION

According to prior art, the focus has been to deliver storage containers to a port as fast as possible. This may however delay container handling vehicles serving the same port since they may be at the port or driving towards the port at the same time. Some container handling vehicles may then have to wait in queue at the port before they can interact with it, i.e. before delivering or retrieving a storage container to/from the port. In this way, the operational capacity of each container handling vehicle is not optimally utilized.

According to the invention, the operational capacity of each container handling vehicles designated to serve the same port is better utilized by letting each container handling vehicle arrive at the port preferably just before another container handling vehicle has finished its interaction with the port.

The invention is defined by a method for utilizing operational capacity of container handling vehicles when assigned tasks of delivering or retrieving identified storage containers at same port of an automatic storage and retrieval system comprising a framework structure defining a storage grid for storing storage containers in storage columns, and where the storage containers are handled by the container handling vehicles running on top of the storage grid, and where the port is used for transferring storage containers to and from the storage and retrieval system.

Where a port is located is irrelevant for the solution according to present invention. As mentioned above, a port can be located at a port column that is used for transferring storage containers at a consolidation station. A port can also be located at a consolidation station or picking station. What is relevant for the solution is a deadline a container handling vehicle needs to be at a port.

The method comprises the following steps performed by a control system communicating with a vehicle controller in each container handling vehicle:

- assigning tasks without deadlines and with deadlines for the container handling vehicles to arrive at the port;
- calculating end times and end positions of the container handling vehicles when the assigned tasks without a deadline complete;
- checking if container handling vehicles can meet a deadline after first completing a task without a deadline;
- ranking the tasks assigned to the container handling vehicles where tasks that can meet the deadline, after first finishing a task without a deadline, are ranked first, and further according to arrival times of the container handling vehicles at the port;
- executing tasks by communicating instructions to the container handling vehicles according to the ranking of tasks.

According to one embodiment, the end times and end positions of the container handling vehicles when the assigned tasks without a deadline complete are calculated according to parameters based on one or more of the following:

- driving time from current location of container handling vehicles to the task;
- other traffic including possible blocking of a route of container handling vehicle from its location to the task;
- time when the container handling vehicles is available;
- battery level of container handling vehicles.

According to one embodiment, it is checked if the container handling vehicles can meet the deadline based on the calculated end position and end times of the container handling vehicles after first completing the task without a deadline.

According to one embodiment, container handling vehicles that can meet the deadline are given a bonus point, while container handling vehicles that cannot meet the deadline are given a penalty point and ranking are performed according to points given.

According to one embodiment of the method, where it is calculated that the assigned task without a deadline would cause the container handling vehicle to miss the deadline of the assigned task with a deadline, then ranking the assigned job with the deadline ahead of the assigned job without a deadline thereby first executing the task with the deadline, and subsequently the task without the deadline.

According to one embodiment, assigned but unfinished tasks without a deadline are reassigned to a different container handling vehicle which has capacity within its schedule to complete the reassigned task without a deadline.

The present invention is further defined by a control system for utilizing operational capacity of container handling vehicles when assigned tasks of delivering or retrieving identified storage containers at same port of an automatic storage and retrieval system comprising a framework structure defining a storage grid for storing storage containers in storage columns. The storage containers are handled by the container handling vehicles running on top of the storage grid, and where the port is used for transferring storage containers to and from the storage and retrieval system. The system comprises a control system communicating with a vehicle controller in each container handling vehicle. The control system comprises a processor arranged for running a computer program that when executed performs the method described above.

The invention is further defined by a computer program that when executed by a processor in a control system of an automated storage and retrieval system performs the method described above for utilizing operational capacity of container handling vehicles when assigned tasks of delivering or retrieving identified storage containers at same port of an automatic storage and retrieval system.

BRIEF DESCRIPTION OF THE DRAWINGS

The following drawings are appended to facilitate the understanding of the invention. The drawings show embodiments of the invention, which will now be described by way of example only, where:

FIG. 4 is a table showing tasks assigned to container handling vehicles.

FIG. 5 is a table showing ranking of tasks and assigned vehicles.

REFERENCES

Figure 1:
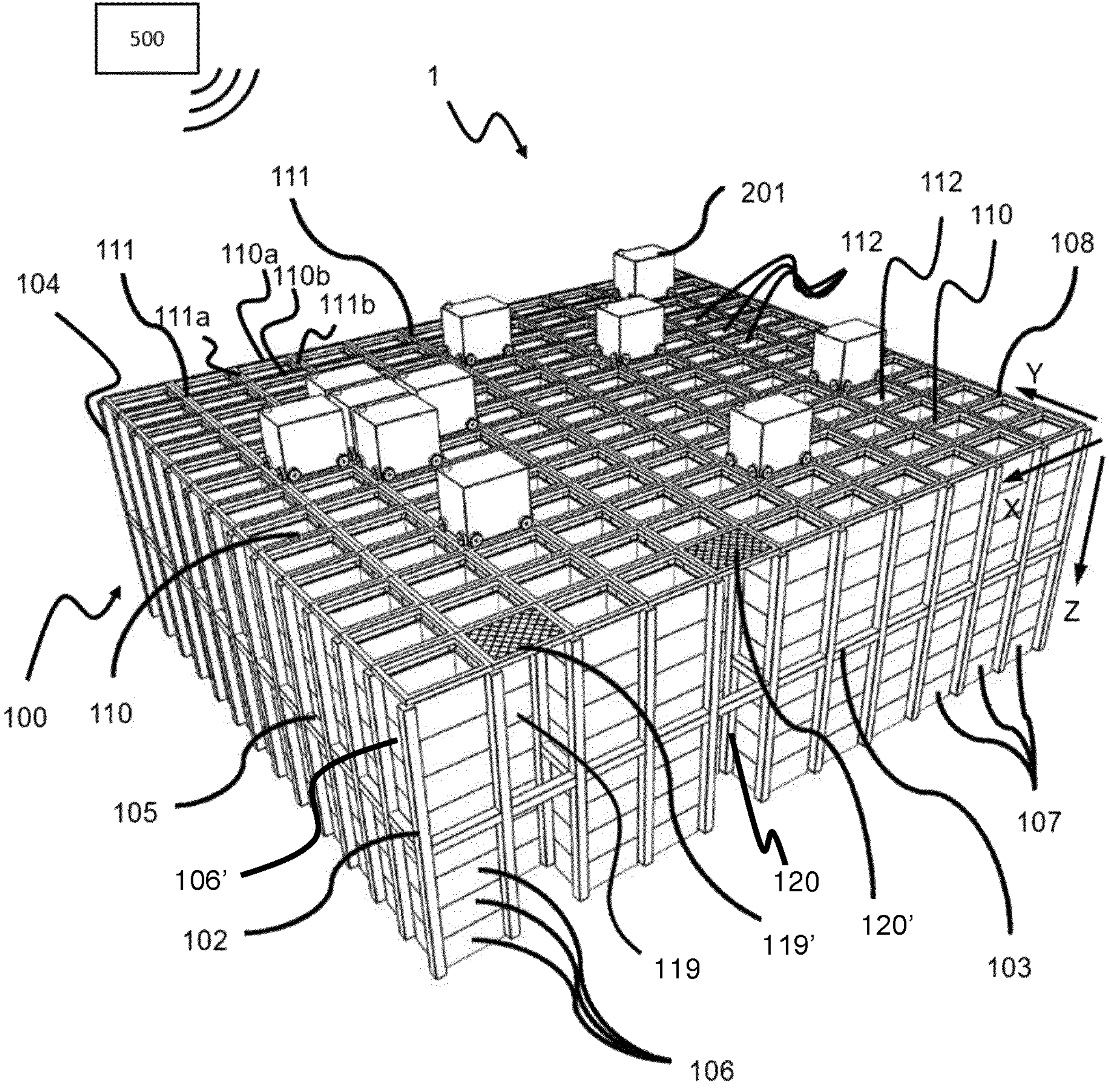
FIG. 1 is a perspective view of a framework structure of a prior art automated storage and retrieval system.

1—Automated storage and retrieval system
100—Framework structure
102—Upright members of framework structure
103—Horizontal members of framework structure
104—Storage grid structure
105—Storage column
106—Storage container
106'—Particular position of storage container
107—Stack
108—Rail system
110—Parallel rails in first direction (X)
110*a*—First rail in first direction (X)
110*b*—Second rail in first direction (X)
111—Parallel rail in second direction (Y)
111*a*—First rail of second direction (Y)
111*b*—Second rail of second direction (Y)
112—Access opening
119—first Port column
119'—first Port
120—second Port column
120'—second Port
200—Routing planner
201—Container handling vehicle
210—Database
220—Master controller
225—Transmitter/Receiver
230—Vehicle controller
X—First direction
Y—Second direction
Z—Third direction
500—Control system

DETAILED DESCRIPTION OF THE INVENTION

In the following description, the invention will be explained in more detail with reference to the appended drawings. It should be understood, however, that the drawings are not intended to limit the invention to the subject-matter depicted in the drawings.

A typical prior art automated storage and retrieval system 1 with a framework structure 100 was described in the background section above with reference to FIG. 1.

The framework structure 100 can be of any size, and it is understood that it can be considerably wider and/or longer and/or deeper than the one disclosed in FIG. 1. For example, the framework structure 100 may have a horizontal extent of more than 700×700 columns and a storage depth of more than twelve containers.

Also, the storage grid 104 can be considerably deeper than disclosed in FIG. 1. For example, the storage grid 104 may be more than twelve grid cells 122 deep, i.e. in the Z direction indicated in FIG. 1.

The container handling vehicles 201 can be of any type known in the art, e.g. any one of the automated container handling vehicles disclosed in WO2014/090684 A1, in NO317366 or in WO2015/193278A1.

The rail system 108 arranged across the top of the framework structure 100 allows the container handling vehicles 201 to move horizontally between storage columns 105 and first and second ports 119', 120' that they are interacting with, i.e. the ports 119', 120' they are instructed to deliver or retrieve a storage container 106 to and from.

When describing the invention below, port 119' is used as an example of the port 119' a set number of container handling vehicles 201 are assigned to interact with. The number of vehicles may for instance be 4 to 8.

The present invention provides a method and control system for avoiding queue at a port 119' by better controlling each container handling vehicle 201 instructed to interact with the same port 119'.

Figure 3:
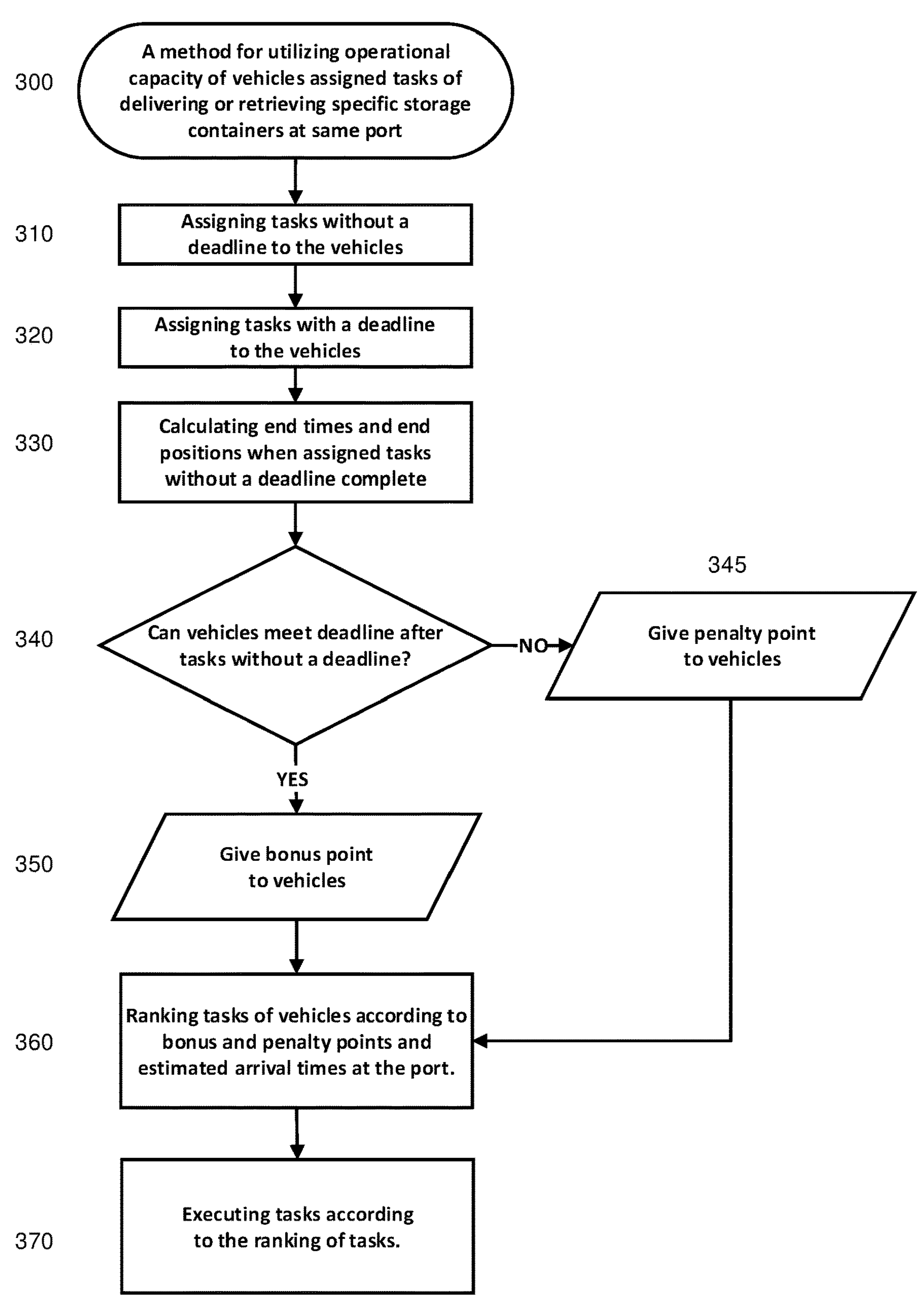
FIG. 3 is a flowchart illustrating the different steps of the method for utilizing operational capacity of container handling vehicles.

FIG. 3 is a flowchart illustrating the different steps of the method for utilizing operational capacity of container handling vehicles 201 assigned tasks of delivering or retrieving identified storage containers 106 at same port of an automatic storage and retrieval system 1 comprising a framework structure 100. The framework structure defines a storage grid 104 for storing storage containers 106 in storage columns 105. The storage containers 106 are handled by the container handling vehicles 201 running on top of the storage grid 104. In this example, the port 119' is located at an opening of a port column 119 which is used for transferring storage containers 106 to and from the storage and retrieval system 1. Several steps are performed by a control system 500 communicating with a vehicle controller 230 in each container handling vehicle 201.

Each container handling vehicle 201 is assigned tasks. An assigned task can for instance be to deliver a specific storage container at the port 119' or to move a storage container from one location to another location.

Some tasks have higher priority than others. High priority tasks will be assigned with deadlines while other tasks are assigned without a deadline. A task with a deadline will typically be a task where a specific storage container is requested to be transferred in the port 119'.

A first step of the method 300 according to the invention is to assign tasks without and with deadlines 310, 320 for the container handling vehicles 201. Which container handling vehicle 201 that is assigned to handle a specific storage container 106 is based on cost parameters. Examples of cost parameters are distance and driving time from a current location of a container handling vehicle 201 to a location of a specific storage container 106; digging time; traffic situation including possible other container handling vehicles 201 blocking a path to the location of the storage container 106; time when the container handling vehicle 201 is available; battery level of container handling vehicle 201, etc.

Digging time is the time a container handling vehicle 201 will use to remove other storage containers 106 positioned above a target storage container 106 in a storage column 105. Digging can be performed with the same container handling vehicle 201 that is used for transporting a target storage container 106 to the port 119'. Alternatively, digging can be formed by dedicated container handling vehicles 201 used only for digging. In this case, digging time can be disregarded or at least reduced for the container handling vehicle 201 that is assigned a task, i.e. to deliver a specific storage container 106 at the port 119'.

Based on said cost parameters, the next step is calculating end times and end positions of the container handling vehicles 201 when tasks assigned without a deadline are completed 330.

As mentioned, this can be calculated according to cost parameters based on one or more of the following: time elapsed when driving from a current location of container handling vehicles 201 to a new location where a task is completed; other traffic influencing the container handling vehicle 201 when driving from its current location to the task; time when the container handling vehicles 201 is available; battery level of container handling vehicles 201.

The next step of the method is to check if the container handling vehicles 201 can complete assigned tasks with a deadline after first finishing the tasks without a deadline. This check is performed by calculating time elapsed for the container handling vehicles 201 to perform the task with a deadline when starting from its location after first finishing the task without a deadline.

In one embodiment, checking can result in bonus points or penalty points given to container handling vehicles 201. If the checking concludes that a container handling vehicle 201 cannot meet the deadline 340, it is given a penalty point 345. If the checking concludes that a container handling vehicle 201 can meet the deadline 340, it is given a bonus point 350.

In one embodiment, assigned but unfinished tasks without a deadline are reassigned to a different container handling vehicle 201 which has capacity within its schedule to complete the reassigned task without a deadline. In this way a container handling vehicle 201 can prioritize tasks with deadlines.

After this, the next step is ranking tasks assigned to the container handling vehicles 201 according to bonus and penalty points as well as estimated arrival times at the port 360. Tasks that can be performed within the deadline, after first finishing a task without a deadline, are ranked first, and further according to arrival times of the container handling vehicles 201 at the port 119'. An example is described below with reference to FIGS. 4 and 5.

The last step of the method is executing tasks by communicating instructions to the container handling vehicles 201 according to the ranking of tasks. The instructions comprise information of where to pick up a storage container and which storage container 106 it is as well as which port it shall be delivered to.

FIG. 4 is a table showing an example of tasks assigned to container handling vehicles 201. Tasks without a deadline are indicated as 1.1 to 6.1 while tasks with a deadline are indicated as 1.2 to 6.2. The table further shows if assigned container handling vehicles 201 can finish an assigned task without the deadline and still perform a task with the deadline. If yes, the task without a deadline is performed before the task with a deadline. If no, the task with a deadline is performed before the task without a deadline. This is reflected in the task priority column in the figure, e.g. for assigned vehicle 010 task 1.1 without deadline is performed before task 1.2 with deadline. The last column shows examples of arrival times at same designated port where storage containers 106 shall be delivered, i.e. arrival times at the port 119' before the deadline for the task with deadline for each designated container handling vehicle 201.

FIG. 5 is a table showing the resulting ranking of tasks and assigned vehicles as the tasks are being executed as instruction to the container handling vehicles 201. The resulting ranking is based on the task priority and arrival times deduced in FIG. 4. Container handling vehicles 201 arriving at the port 119' first are ranked first, and container handling vehicles 201 arriving at the port just before the deadline are ranked last.

Tasks assigned for vehicles are executed and instructions are transmitted to each container handling vehicle 201 according to the ranked list. In this way, the operational capacity of each container handling vehicle 201 is better utilised since task without a deadline can be performed before tasks with a deadline if a container handling vehicle 201 can still perform an assigned task within a set deadline. Container handling vehicles 201 assigned to interact with the same port 119' will then less likely to have to wait for each other to finish interacting with the port, i.e. interacting in the terms of delivering or retrieving storage containers 106 to or from the port 106'.

The invention is further defined by a control system 500 for utilizing operational capacity of container handling vehicles 201 when assigned tasks of delivering or retrieving identified storage containers 106 at same port 119', 120' of an automatic storage and retrieval system 1 as the one described above with reference to FIG. 1.

Figure 2:
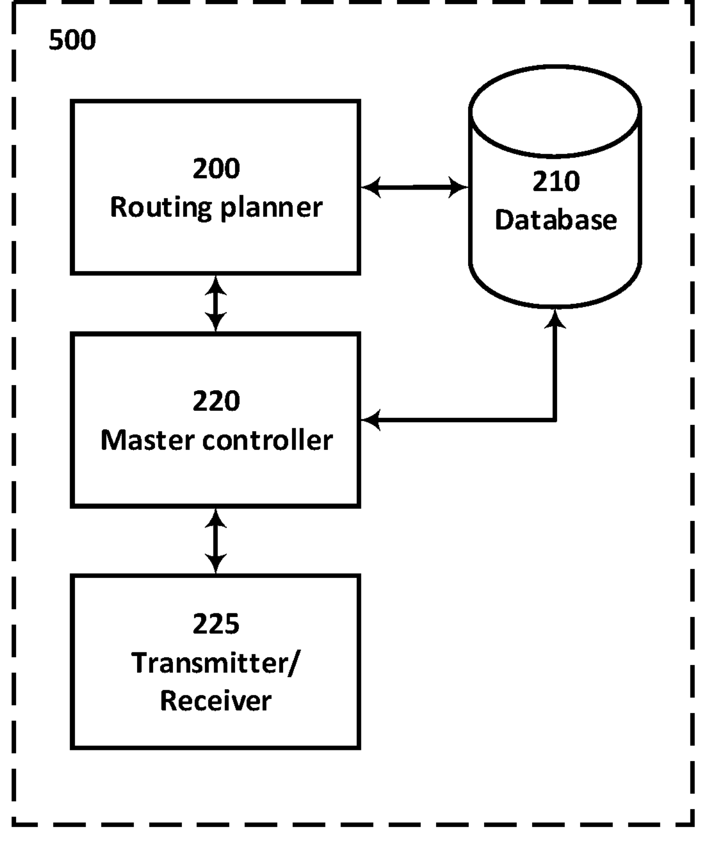
FIG. 2 shows a control system for controlling container handling vehicles operating on an automated storage and retrieval system.
Figure 2:
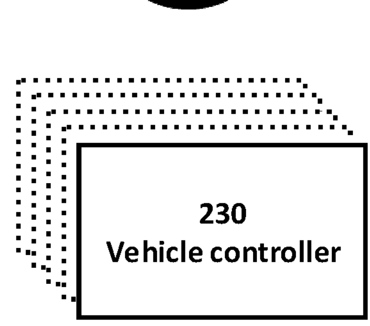

The control system 500 is described above with reference to FIG. 2 and comprises a master controller 220, a database 210 keeping track of current locations of storage containers 106, a routing planner 200 for finding optimal routes for the container handling vehicles 201 based on cost parameters, also described above, and a transmitter/receiver 225 for communicating instructions to each container handling vehicle 201, preferably wirelessly. The control system 500 further comprises a processor arranged for running a computer program that when executed performs the method described above thereby utilizing operational capacity of container handling vehicles 201 when assigned tasks with and without deadlines.

The present invention addresses and solves the problem of container handling vehicles having to wait in queue at a port 119'. Instead, the port 119' is served by a container handling vehicle 201 with minimal waiting time at the port 119' and the container handling vehicles 201 are instructed to perform other intermediate tasks if possible before delivering or retrieving a storage container 106 to and from the port 119' within a deadline.

The invention claimed is:

1. A method for utilizing operational capacity of container handling vehicles when assigned tasks of delivering or retrieving identified storage containers at a same port of an automatic storage and retrieval system comprising a framework structure defining a storage grid for storing storage containers in storage columns, and wherein the storage containers are handled by the container handling vehicles running on top of the storage grid, and wherein the port is used for transferring storage containers to and from the storage and retrieval system, wherein a control system communicating with a vehicle controller in each container handling vehicle performs:

assigning tasks without deadlines and with deadlines for the container handling vehicles to arrive at the port;

calculating end times and end positions of the container handling vehicles when the assigned tasks without a deadline complete;

checking if container handling vehicles can meet a deadline after first completing a task without a deadline;

ranking the tasks assigned to the container handling vehicles, where tasks for which the deadline can be met after first finishing a task without a deadline are ranked first, and further according to arrival times of the container handling vehicles at the port; and executing tasks by communicating instructions to the container handling vehicles according to the ranking of tasks.

2. The method according to claim 1, wherein the end times and end positions of the container handling vehicles when the assigned tasks without a deadline complete are calculated according to parameters based on one or more of:

driving time from current location of container handling vehicles to the task;

other traffic including possible blocking of a route of container handling vehicle from a current location of the container handling vehicle to the task;

time when the container handling vehicles is available;

battery level of container handling vehicles.

3. The method according to claim 1, wherein checking if the container handling vehicles can meet the deadline is based on the calculated end position and end times of the container handling vehicles after first completing the task without a deadline.

4. The method according to claim 1, wherein container handling vehicles that can meet the deadline are given a bonus point, while container handling vehicles that cannot meet the deadline are given a penalty point and ranking are performed according to points given.

5. The method according to claim 1, wherein it is calculated that the assigned task without a deadline would cause the container handling vehicle to miss the deadline of the assigned task with a deadline, then ranking the assigned task with the deadline ahead of the assigned task without a deadline thereby first executing the task with the deadline, and subsequently the task without the deadline.

6. The method according to claim 1, wherein assigned but unfinished tasks without a deadline are reassigned to a different container handling vehicle which has capacity within its schedule to complete the reassigned task without a deadline.

7. A control system for utilizing operational capacity of container handling vehicles when assigned tasks of delivering or retrieving identified storage containers at a same port of an automatic storage and retrieval system comprising a framework structure defining a storage grid for storing storage containers in storage columns, and wherein the storage containers are handled by the container handling vehicles running on top of the storage grid, and wherein the port is used for transferring storage containers to and from the storage and retrieval system, wherein the control system comprises a master controller, a database keeping track of the storage containers, a routing planner for finding optimal routes for the container handling vehicles and a transmitter/receiver for communicating instructions to each container handling vehicle, wherein the control system further comprises a processor arranged for running a computer program that when executed performs a method comprising:

assigning tasks without deadlines and with deadlines for the container handling vehicles to arrive at the port;

calculating end times and end positions of the container handling vehicles when the assigned tasks without a deadline complete;

checking if container handling vehicles can meet a deadline after first completing a task without a deadline;

ranking the tasks assigned to the container handling vehicles, where tasks for which the deadline can be met after first finishing a task without a deadline are ranked first, and further according to arrival times of the container handling vehicles at the port; and executing tasks by communicating instructions to the container handling vehicles according to the ranking of tasks.

8. A computer program that when executed by a processor in a control system of an automated storage and retrieval system performs a method for utilizing operational capacity of container handling vehicles when assigned tasks of delivering or retrieving identified storage containers at a same port of an automatic storage and retrieval system, wherein the automatic storage and retrieval system comprises a framework structure defining a storage grid for storing storage containers in storage columns, and wherein the storage containers are handled by the container handling vehicles running on top of the storage grid, and wherein the port is used for transferring storage containers to and from the storage and retrieval system, the method comprising:

assigning tasks without deadlines and with deadlines for the container handling vehicles to arrive at the port;

calculating end times and end positions of the container handling vehicles when the assigned tasks without a deadline complete;

checking if container handling vehicles can meet a deadline after first completing a task without a deadline;

ranking the tasks assigned to the container handling vehicles, where tasks for which the deadline can be met after first finishing a task without a deadline are ranked first, and further according to arrival times of the container handling vehicles at the port; and executing tasks by communicating instructions to the container handling vehicles according to the ranking of tasks.

* * * * *